UNITED STATES PATENT OFFICE.

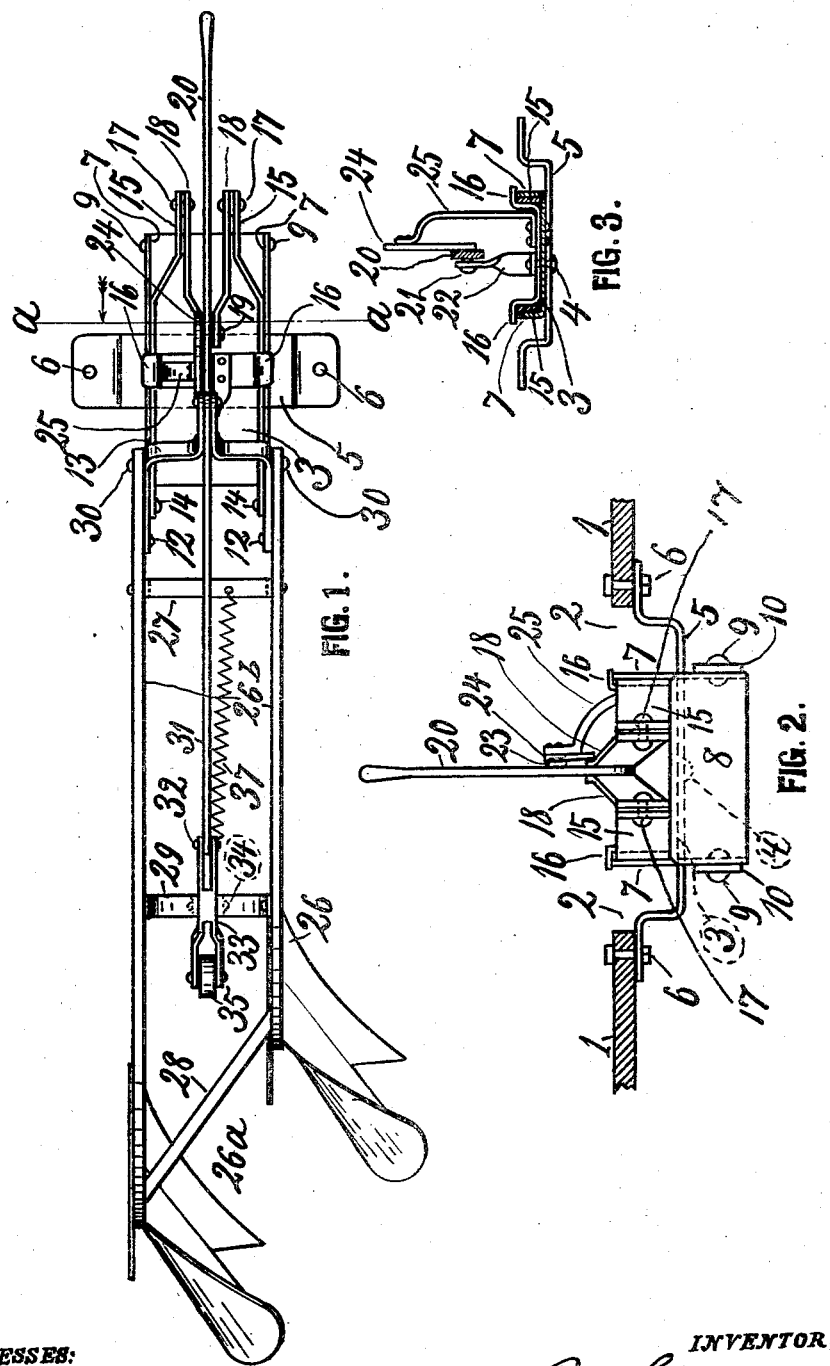

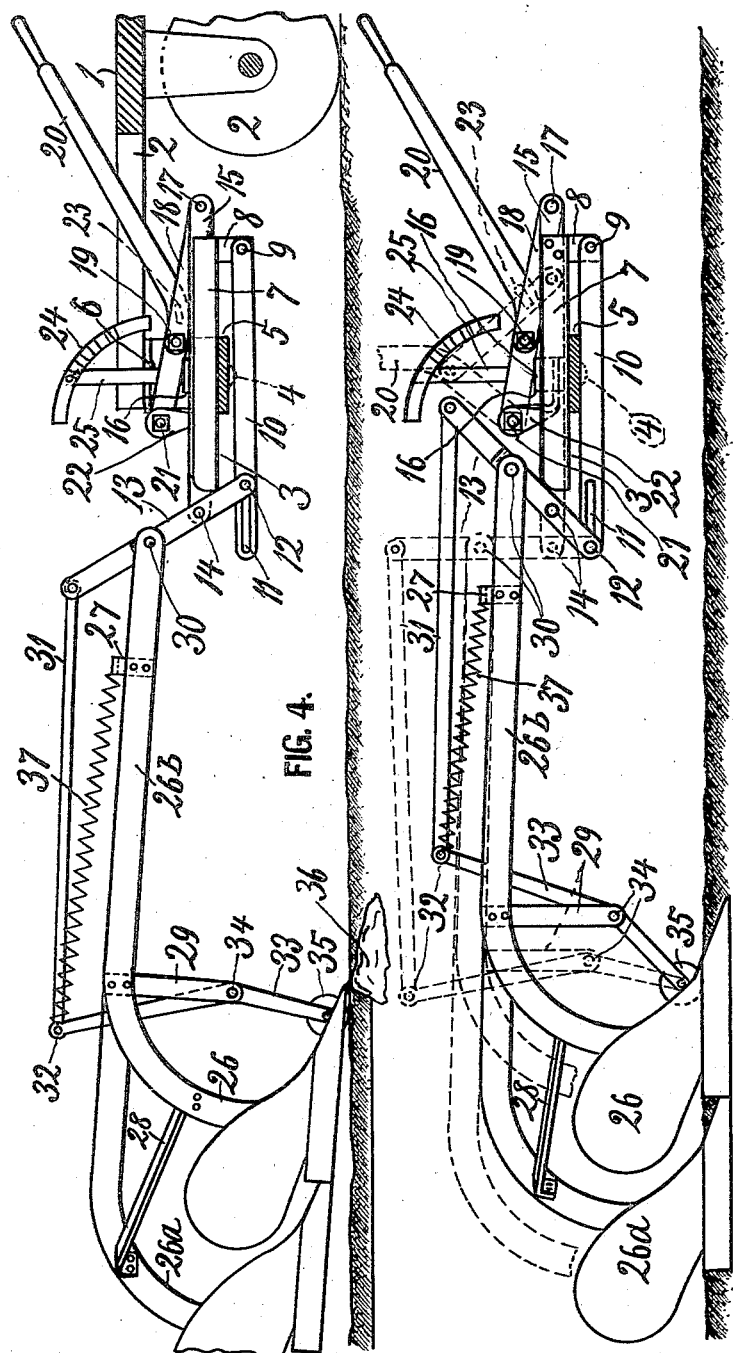

PETER CLANCY, OF ST. PAUL, MINNESOTA.

PLOW.

1,030,282.  Specification of Letters Patent.  Patented June 25, 1912.

Application filed November 25, 1911. Serial No. 662,258.

*To all whom it may concern:*

Be it known that I, PETER CLANCY, a citizen of the United States, residing at St. Paul, in the county of Ramsey and State of Minnesota, have invented a new and useful Plow, of which the following is a specification.

My invention relates to plows; and the object is to provide a plow which will automatically free itself from obstructions in the ground and adjust itself to working position without stopping or retarding the forward progress of the plow. This is an advantage in gang plows in general but especially so in gang plows drawn by a truck and a traction engine, as is well known by those using such power-operated plows.

In the accompanying drawing Figure 1 is a top view of one of the pairs of plows usually secured together and drawn by an engine; said plows being arranged and operated according to any invention. Fig. 2 is an enlarged front end elevation of the draw-head shown in Fig. 1 with fragments of the engine truck secured thereto. Fig. 3 is a section on the line *a—a* of Fig. 1. Fig. 4 is a partly sectional side elevation of the plow shown in Fig. 1 with a portion of the engine truck added; the plow being in the position it occupies when passing over a rock in the ground. Fig. 5 is a partly sectional side elevation of the plow in working position in the ground and in dotted position as raised above the ground when it is idle.

Referring to the drawing by reference numerals, 1 designates the rear portion of a frame or platform mounted on wheels 2, of which only one is shown in Fig. 4. Said truck is drawn either by draft animals or by a traction engine (not shown). The rear end of the truck, or its frame 1, is provided with several large gaps 2, for draw-heads as 3 of the plows to pass freely into and be pivoted at 4 to a transverse draw-bar 5, which has its ends secured by bolts 6 to said truck. The draw-head is thus pivoted to swing in a horizontal plane on the bolt 4; and consists mainly of a plate 3, formed with longitudinal upstanding side ribs 7 and at the front end with a downward projection 8. At the outer sides of said projection are pivoted at 9 the front ends of two normally horizontal links 10, each with a slot 11 in its rear end. In said slots slide back and forth headed studs 12, which are fixed in the legs or lower arms of an A-shaped lever or yoke 13. Pivoted at 14 to said lower arms of the yoke are the rear ends of two link-rods 15, which slide in keepers 16 on the draw-head and have their front ends offset inward and pivoted at 17 to links 18, whose rear ends are pivoted at 19 to a hand lever 20, which is fulcrumed at 21 to a bracket 22, that is secured upon the plate or body 3 of the draw-head, in the present instance by the bolt 4. Said lever is provided with a lateral projection 23 (see Fig. 2) adapted to engage notches of a notched sector 24, which by an arm 25 is mounted upon the draw-head, whereby the lever may be held in any desired position, and thereby hold the yoke 13 in a more or less raised position, as shown in dotted lines in Fig. 5.

The plow may be of the single type but I prefer the double type shown, in which two plows 26 and 26$^a$ have their beams 26$^b$ rigidly secured together by a transverse bar 27, a slanting rear brace bar 28, and a downward hanger 29 forward of said brace. The two plows may be referred to as "the plow," "a plow," a double plow, or two plows secured together.

The plow beams 26$^b$ are pivotally attached at 30, one to each leg of the yoke 13; and pivoted to the top of the yoke extends rearwardly a rod 31, whose rear end is pivoted at 32 to the upper end of a two-armed lever 33, which is fulcrumed at 34 in the rigid hanger or arm 29. Said lever is at the lower end inclined rearwardly and provided with a supporting roller 35.

In the operation of the plow, when the lever 20 is resting in the forwardly leaning position shown in Figs. 1, 4 and 5, the yoke 13 leans forward as shown in full lines in Fig. 5, and as this brings the pivot 19 in a straight line with the pivots 21 and 17, or even a little below said line, the lever 20 is thereby locked against being raised by the rearward strain on the yoke when the plows are in operation in the ground. But if the operator decides to raise the plow above the ground and drive it idle, he raises the lever 20 to about vertical position, as indicated by dotted lines 20 in Fig. 5; this will push the rod 15 rearwardly, raising thereby the yoke 13 to a vertical position, which causes the rod 31 to push the upper arm of the lever 33 rearwardly, and as that brings the lower arm of said lever to about vertical position, the plow is thereby raised above the surface of the ground and will remain so until the lever 20 is released from the upright position and folded forward again.

In Fig. 4 is shown that if the plow strikes an obstruction 36 in the ground while the lever 20 is in its forwardly folded position, the strain caused by the obstruction will overcome the rearward pressure given by the weight of the plow and the surface of the ground to the roller 35 and the lever arm holding same, and hence the lever arm with the roller will move forward and by assuming a practically vertical position will lift the plow over the obstruction; and as soon as the plow is thus set free and has passed the obstruction it will move forward and into the ground again, since the lower arm of lever 33 assumes again its rearwardly slanting position as soon as the strain caused by the obstruction of the plow ceases to hold it in vertical position by pulling rearwardly at the pivot 30. During such automatic raising of the plow over an obstruction the pivot studs 12 move into the front ends of the slots 11; this is necessary because in the automatic action the rods 15 can not slide rearward, as they do when the lever 20 is raised, as already described and shown in dotted lines in Fig. 5. A pulling coil spring 37 may be employed between the upper arm of lever 33 and the cross bar 27 of the plow beam when extra quick forward movement of the plow is desired after it is released from an obstruction. Such spring will be desirable in fast moving machine plows, but may be omitted in ordinary plows.

What I claim is—

1. In combination, a plow having a beam and a rigid hanger depending from the rear portion thereof, a two-armed rear lever fulcrumed to the hanger and having its lower arm normally inclined rearwardly and provided with a roller arranged to contact with the ground, and the other arm extended above the beam, a vertically disposed front lever pivoted near its middle to the front end of the plow beam and having two downward arms, a link connecting the upper end of said two levers, a wheel-supported truck, a draw-head pivotally connected therewith to swing in a horizontal plane, two horizontal links pivoted with their front ends to the front portion of the draw head and having their rear ends provided with slots, studs secured in the lower arms of the front lever and slidable in said slots, two upper link rods guided to slide horizontally upon the draw head and having their front ends pivoted to the lower arms of the front lever above the slotted rods, a pair of short links extending upwardly and rearwardly from the front ends of the slidable link rods, a hand-lever fulcrumed with its lower end upon the draw head and having above its fulcrum a pivot engaging the rear ends of said short links, and means on the draw head for holding the lever in the desired position.

2. In combination, a plow having a beam and a rigid hanger depending from the rear portion thereof, a two armed rear lever fulcrumed to the hanger and having its lower arm normally inclined rearwardly and provided with a roller arranged to contact with the ground, and the other arm extended above the beam, a vertically disposed front lever pivoted near its middle to the front end of the plow beam and having two downward arms, a link connecting the upper ends of said two levers, a wheel-supported truck, a draw-head pivotally connected therewith to swing in a horizontal plane, two horizontal links pivoted with their front ends to the front portion of the draw-head and having their rear ends provided with slots, studs secured in the lower arms of the front lever and slidable in said slots, two upper link rods guided to slide horizontally upon the draw head and having their front ends pivoted to the lower arms of the front lever above the slotted rods a pair of short links extended upwardly and rearwardly from the front ends of the slidable link rods, a hand lever fulcrumed with its lower end upon the draw head and having above its fulcrum a pivot engaging the rear ends of said short links, and means on the draw head for holding the lever in the desired position, and a pulling coil spring having one end attached to the upper arm of the rear lever and the other end to the front portion of the plow beam.

In testimony whereof I affix my signature, in presence of two witnesses.

PETER CLANCY.

Witnesses:
 A. CATHNUTS MAXFIELD,
 A. BODIN.